(12) United States Patent
Zhao et al.

(10) Patent No.: US 10,837,137 B2
(45) Date of Patent: Nov. 17, 2020

(54) DRAIN PUMP AND WASHING MACHINE USING THE SAME

(71) Applicant: QINGDAO HAIER WASHING MACHINE CO., LTD., Shandong (CN)

(72) Inventors: Zhiqiang Zhao, Shandong (CN); Sheng Xu, Shandong (CN)

(73) Assignee: QINGDAO HAIER WASHING MACHINE CO., LTD., Shandong (CN)

( * ) Notice: Subject to any disclaimer, the term of this patent is extended or adjusted under 35 U.S.C. 154(b) by 83 days.

(21) Appl. No.: 16/318,165

(22) PCT Filed: Jul. 17, 2017

(86) PCT No.: PCT/CN2017/093171
§ 371 (c)(1),
(2) Date: Jan. 16, 2019

(87) PCT Pub. No.: WO2018/014810
PCT Pub. Date: Jan. 25, 2018

(65) Prior Publication Data
US 2019/0284746 A1 Sep. 19, 2019

(30) Foreign Application Priority Data

Jul. 19, 2016 (CN) .......................... 2016 1 0570485

(51) Int. Cl.
*D06F 39/08* (2006.01)
*F04D 13/06* (2006.01)
(Continued)

(52) U.S. Cl.
CPC ............ *D06F 39/085* (2013.01); *D06F 39/08* (2013.01); *F04D 13/0606* (2013.01);
(Continued)

(58) Field of Classification Search
None
See application file for complete search history.

(56) References Cited

U.S. PATENT DOCUMENTS 6,398,495 B1* 6/2002 Kazianus ............ A47L 15/0021
415/206
6,506,034 B1 1/2003 Lentz et al.
(Continued)

FOREIGN PATENT DOCUMENTS

CN 2863843 Y 1/2007
CN 201502539 U 6/2010
(Continued)

OTHER PUBLICATIONS

International Search Report (PCT/ISA/210) dated Sep. 27, 2017, by the Chinese Patent Office as the International Searching Authority for International Application No. PCT/CN2017/093171.
(Continued)

*Primary Examiner* — Cristi J Tate-Sims
(74) *Attorney, Agent, or Firm* — Buchanan Ingersoll & Rooney PC

(57) ABSTRACT

A drain pump has a sealed cavity formed by a motor base and a pump casing. A partition plate divides the cavity into a motor cavity, and a pump impeller cavity. A side of the partition plate facing the motor cavity is provided with a bearing base. Another side facing the pump impeller cavity comprises a plane; a bearing mounted in the bearing base penetrates through the two cavities. The bearing in the pump impeller cavity slightly protrudes from the plane of the partition plate, and is tightly attached to a pump impeller in the pump impeller cavity, to form a second contact. The pump impeller and a pump impeller shaft are subjected to integral injection molding. The pump impeller shaft is tightly fixed in the bearing, penetrates through the partition (Continued)

plate, enters the motor cavity, and is connected with the pump shaft in the motor cavity.

10 Claims, 1 Drawing Sheet

(51) Int. Cl.
| | |
|---|---|
| *F04D 29/08* | (2006.01) |
| *F16J 15/32* | (2016.01) |
| *H02K 5/124* | (2006.01) |
| *H02K 5/24* | (2006.01) |
| *H02K 7/08* | (2006.01) |
| *H02K 7/14* | (2006.01) |
| *H02K 21/14* | (2006.01) |
| *F04D 29/42* | (2006.01) |
| *F04D 1/00* | (2006.01) |
| *F04D 29/66* | (2006.01) |

(52) U.S. Cl.
CPC ........... *F04D 29/086* (2013.01); *F04D 29/42* (2013.01); *F16J 15/32* (2013.01); *H02K 5/124* (2013.01); *H02K 5/24* (2013.01); *H02K 7/085* (2013.01); *H02K 7/14* (2013.01); *H02K 21/14* (2013.01); *F04D 1/00* (2013.01); *F04D 29/669* (2013.01)

(56) References Cited

U.S. PATENT DOCUMENTS

| | | | |
|---|---|---|---|
| 6,536,242 B1 * | 3/2003 | Boutiette | ............ A47L 15/4225 68/208 |
| 2012/0183421 A1 * | 7/2012 | Kim | ......................... H02K 7/14 417/423.7 |

FOREIGN PATENT DOCUMENTS

| | | | | |
|---|---|---|---|---|
| CN | 203670227 U | 6/2014 | | |
| CN | 105570183 A | 5/2016 | | |
| EP | 1148248 A2 | 10/2001 | | |
| EP | 3045735 A1 * | 7/2016 | ......... | F04D 13/0606 |
| JP | 2003505648 A | 2/2003 | | |
| JP | 2004160242 A | 6/2004 | | |
| JP | 2006194221 A | 7/2006 | | |
| JP | 4957700 B2 | 6/2012 | | |

OTHER PUBLICATIONS

Written Opinion (PCT/ISA/237) dated Sep. 27, 2017, by the Chinese Patent Office as the International Searching Authority for International Application No. PCT/CN2017/093171.

Japanese Office Action dated Aug. 4, 2020 issued by the Japanese Patent Office in corresponding Japanese Patent Application No. 2019-502065, with English translation (11 pages).

* cited by examiner

DRAIN PUMP AND WASHING MACHINE USING THE SAME

TECHNICAL FIELD

The present disclosure belongs to the field of drain pumps, and specifically relates to a drain pump for a washing machine.

BACKGROUND

In order to adapt to a more complex application environment and provide better user experience, all washing machines use drain pumps as active drainage devices. At present, the drain pumps used in the washing machines are all permanent magnet drain pumps. The permanent magnet drain pump includes a permanent magnet motor. A pump body is fixed at one end, adjacent to an output shaft, of the permanent magnet motor. The pump body is tubular. One end of the permanent magnet motor is in sealed connection with one end of the pump body, and the output shaft of the permanent magnet motor extends into the pump body. A pump impeller is fixed at an end of the output shaft of the permanent magnet motor. In order to avoid damage to the motor caused when liquid in the pump body enters the motor along the output shaft, generally, a sealing gasket is arranged at a joint between an output pump on the pump body side of the drain pump and a partition plate. In order to mount such part, the partition plate needs to adopt a sinking counterbore design on the pump body side. The design not only increases part numbers of the drain pump, makes the drain pump more difficult to maintain and overhaul, and reduces overall reliability of the pump impeller, but also makes a space between the pump impeller and the partition plate. And due to the space, a pressure difference is generated between two sides of the pump impeller when the pump impeller runs fast, and certain noise is generated.

On the premise of meeting sealing conditions and ensuring that the liquid cannot enter the motor cavity through the pump impeller cavity, how to simplify the structure of the drain pump, enhance the reliability of the drain pump, and further reduce noise generated when the pump runs from the generation source of the noise more significantly are problems that need to be solved at present.

The present disclosure is provided in view of this.

SUMMARY

To overcome defects of the prior art, the present disclosure provides a drain pump and a washing machine using the same. Parts of the drain pump are effectively reduced, the assembly efficiency is high, the sealing effect is good, at the same time noise generated when the drain pump runs is obviously reduced.

In order to achieve the objective, the present disclosure adopts the following technical solutions.

A drain pump includes a pump impeller, a pump impeller shaft, a pump shaft, a permanent magnet, a bearing, a motor base, a pump casing, and a partition plate, wherein a sealed cavity is formed by the motor base and the pump casing. The partition plate divides the sealed cavity into two cavities on two sides. One cavity is a motor cavity, and the other cavity is a pump impeller cavity. The pump impeller is located in the pump impeller cavity. A side of the partition plate (23) facing the motor cavity (27) is provided with a bearing base (17) with a cylindrical structure. Another side of the partition plate (23) facing the pump impeller cavity (28) is a plane. The bearing is firmly mounted in the bearing base, and penetrates through the two cavities through a central hole in the bearing base of the partition plate. The bearing in the pump impeller cavity slightly protrudes from the plane of the partition plate, and is tightly attached to the pump impeller, to form a second contact, The pump impeller and the pump impeller shaft are subjected to integral injection molding. And the pump impeller shaft is tightly fixed in the bearing, penetrates through the partition plate, enters the motor cavity, and is connected with the pump shaft in the motor cavity.

Further, the pump impeller shaft and the pump shaft are in threaded connection, and a threaded fastening direction is identical to a rotation direction of the pump impeller.

Further, a circular groove is formed in the pump impeller shaft circumferentially, and a sealing ring is arranged in the groove, to completely fill a gap between an inner wall of the bearing and the pump impeller shaft.

Further, the pump shaft and the permanent magnet are integrally arranged.

Further, the bearing is tightly attached to the permanent magnet or to a projection subjected to integral injection molding together with the permanent magnet, to form a first contact.

Further, the pump casing and the motor base are fixedly connected by bolts or screws. A contact part, attached to the plane of the partition plate, of the pump casing is a limiting table. The limiting table is circular; and the radius of the limiting table is greater than that of the partition plate.

Further, a circumferential edge of the partition plate is bent towards the motor cavity, to form a first extrusion sealing structure of the partition plate.

Further, a part, corresponding to the partition plate, of the motor base comprises a bulge, to form a second extrusion sealing structure of the motor base.

Further, a circular sealing ring is extruded by the first extrusion sealing structure and the second extrusion sealing structure.

In addition, the present disclosure further discloses a washing machine, including a drain pump having any one of the features.

The following describes specific embodiments of the present disclosure in detail with reference to the accompanying drawings.

BRIEF DESCRIPTION OF THE DRAWINGS

Being a part of the present disclosure, the accompanying drawings are intended to provide a further understanding of the present disclosure. Example embodiments and descriptions thereof in the present disclosure are intended to illustrate the present disclosure, but do not constitute any improper limitation to the present disclosure. Apparently, the accompanying drawings in the description below are merely some embodiments, based on which other drawings may be obtained by those of ordinary skilled in the art without creative effort. In the accompanying drawing.

In the figures: 1: Drain opening; 2: Pump casing; 3: Water inlet; 4: Pump plug; 5: Pump base; 6: Residual water opening; 7: Pump impeller: 8: Limiting table; 9: First extrusion sealing structure; 10: Connecting hole; 11: Circular sealing ring; 12: Permanent magnet; 13: Pump shaft; 14: Silicon steel sheet; 15: Motor casing; 16:

Bearing; 17: Bearing base; 18: Pump cavity; 19: Gap; 20: Pump impeller shaft; 21: Threaded connection; 22: Sealing ring; 23: Partition plate; 24: First contact; 25: Motor base; 26: Second contact; 27: Motor cavity; 28: Pump impeller cavity; 29: Second extrusion sealing structure.

It should be noted that these drawings and the text description are not intended to limit the conception scope of the present disclosure in any way, and the concept of the present disclosure is described to those skilled in the art with reference to specific embodiments.

DETAILED DESCRIPTION

To make the objectives, technical solutions and advantages of the embodiments of the present disclosure clearer, a clear and complete description of the technical solutions in the present disclosure will be given below, in combination with the accompanying drawings in the embodiments of the present disclosure. The following embodiments are used to describe the present disclosure, but not intended to limit the scope of the present disclosure.

In the description of the present disclosure, it should be noted that orientation or position relationships indicated by the terms such as "on", "below", "front", "back", "left", "right", "vertical", "inside", and "outside" are based on the accompanying drawings, are merely used for facilitating description of the present disclosure and simplifying the description, and do not indicate or imply that the device or element referred thereto has a specific orientation or is constructed and operated in a specific orientation. Therefore, the terms should not be considered as limitations to the present disclosure.

In the description of the present disclosure, it should be noted that the terms "mount", "connected", and "connection" should be understand in a broad sense. For example, "connection" may be fixed connection, detachable connection, or integral connection, may be mechanical connection or electric connection, and may be direct connection or indirect connection using an intermediate medium. Those of ordinary skilled in the art may understand specific meanings of the foregoing terms in the present disclosure in specific cases.

Figure 1:
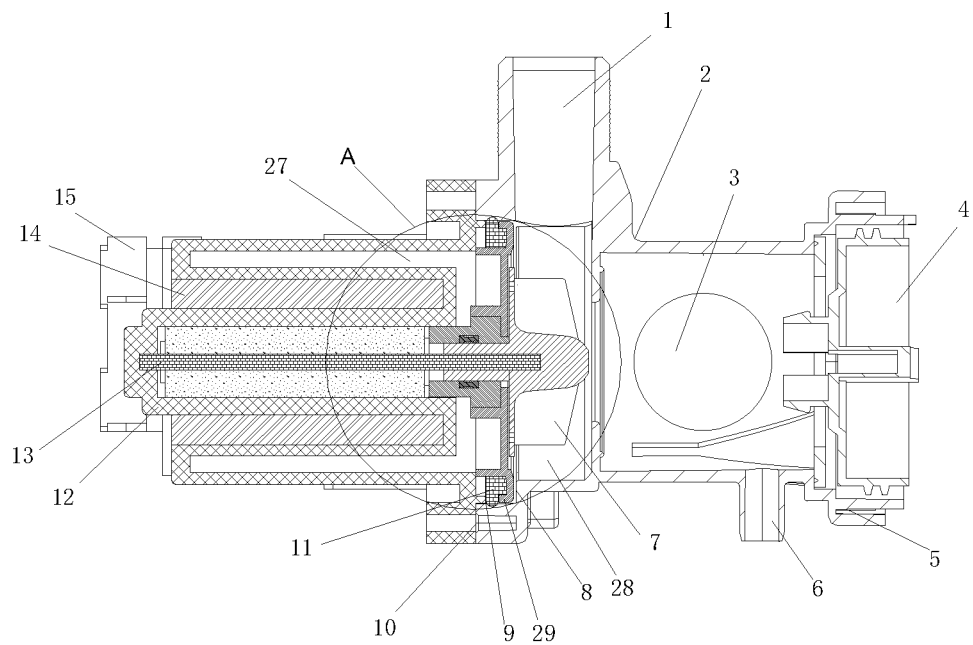
FIG. 1 is a structural cutaway view of a drain pump of the present disclosure.
Figure 2:
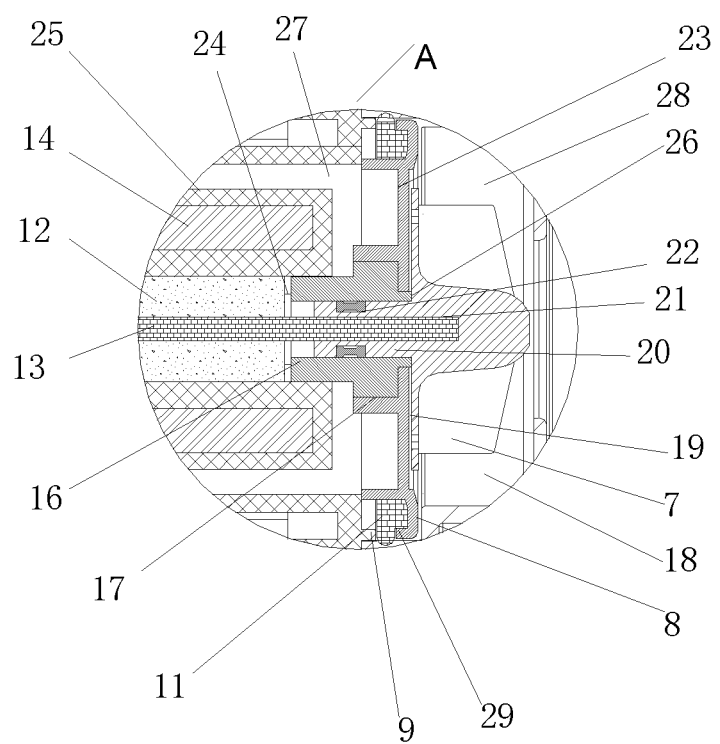
FIG. 2 is a structural partial enlarged cutaway view of a drain pump of the present disclosure.

As shown in FIG. 1 to FIG. 2, the present disclosure discloses a drain pump and a washing machine using the same. The drain pump including a pump impeller 7, a pump impeller shaft 20, a pump shaft 13, a permanent magnet 12, a bearing 16, a motor base 25, a pump casing 2, and a partition plate 23. Wherein, a sealed cavity is formed by the motor base 25 and the pump casing 2. The partition plate 23 divides the sealed cavity into two cavities on two sides. One cavity is a motor cavity 27, and the other cavity is a pump impeller cavity 28. The pump impeller 7 is located in the pump impeller cavity 28. A side of the partition plate 23 facing the motor cavity 27 is provided with a bearing base 17 with a cylindrical structure. Another side of the partition plate 23 facing the pump impeller cavity 28 is a plane. The bearing 16 is firmly mounted on the bearing base 17, and penetrates through the two cavities through a central hole in the bearing base 17 of the partition plate 23. The bearing 16 in the pump impeller cavity 28 slightly protrudes from the plane of the partition plate 23, and is tightly attached to the pump impeller 7, to form a second contact 26. The pump impeller 7 and the pump impeller shaft 20 are subjected to integral injection molding. The pump impeller shaft 20 is tightly fixed in the bearing 16, penetrates through the partition plate 23, enters the motor cavity 27, and is connected with the pump shaft 13 in the motor cavity 27.

Embodiment 1

As shown in FIG. 1 and FIG. 2, the drain pump of the present disclosure includes a pump impeller 7, a pump impeller shaft 20, a pump shaft 13, a permanent magnet 12, a bearing 16, a motor base 25, a pump casing 2, and a partition plate 23. Wherein, a sealed cavity is formed by the motor base 25 and the pump casing 2. The partition plate 23 divides the sealed cavity into two cavities on two sides. One cavity is a motor cavity 27, and the other cavity is a pump impeller cavity 28. The pump impeller 7 is located in the pump impeller cavity 28. A side of the partition plate 23 facing the motor cavity 27 is provided with a bearing base 17 with a cylindrical structure. Another side of the partition plate 23 facing the pump impeller cavity 28 is a plane. The bearing 16 is firmly mounted in the bearing base 17, and penetrates through the two cavities through a central hole in the bearing base 17 of the partition plate 23. The bearing 16 in the pump impeller cavity 28 slightly protrudes from the plane of the partition plate 23, and is tightly attached to the pump impeller 7, to form a second contact 26. The pump impeller 7 and the pump impeller shaft 20 are subjected to integral injection molding. The pump impeller shaft 20 is tightly fixed in the bearing 16, penetrates through the partition plate 23, enters the motor cavity 27, and is connected with the pump shaft 13 in the motor cavity 27.

In most of existing drain pump designs, the joint between the pump shaft and the pump impeller is at the pump cavity side, that is, in a liquid environment. To fit the pump impeller and the pump shaft better, generally, a copper insert is connected to a tail end of the pump shaft. The insert is tightly inserted into the pump impeller to be connected to the pump impeller. To prevent liquid from entering into the joint between the pump impeller and the pump shaft, the insert also needs to be provided with a sealing ring structure. In addition, to prevent the pump impeller or the insert from abrading the partition plate, a gasket that is generally made of wear-resistant plastic POM is further needed. As a result, a large quantity of parts and components are combined, which makes the drain pump have high production cost and complex assembly.

In the present disclosure, the pump impeller 7 and the pump impeller shaft 20 are of an integral structure. Due to the design, the pump impeller shaft 20 can pass, through the interior of the bearing 16, through the partition plate 23 into a permanent magnet 12 rotation cavity, so that a joint between the pump impeller shaft 20 and the pump shaft 13 is in a liquid-free cavity environment. Therefore, water corrosion at the joint is out of consideration, and to a large extent the structure of the drain pump is simplified.

Examples are given in the present disclosure, the pump impeller shaft 20 and the pump shaft 13 are in threaded connection with each other, and the threaded fastening direction is identical to the rotation direction of the pump impeller 7. (Certainly, those skilled in the art may also associate fixed connection between the pump impeller shaft and the pump shaft with various connection manners such as interference fit connection, bonding connection, or splined connection).

To implement sealing between the pump impeller cavity 28 and the motor cavity 27 better, a circular groove is formed in the pump impeller shaft 20 circumferentially. A sealing ring 22, preferably a V-shaped sealing ring or a Y-shaped sealing ring, is placed in the groove to completely fill a gap between the inner wall of the bearing 16 and the pump impeller shaft 20, thereby effectively preventing water from entering the motor cavity 27 from a pump cavity 18.

In addition, due to integral arrangement of the pump shaft 13 and the permanent magnet 12, component combinations are further reduced.

Embodiment 2

As shown in FIG. 1 and FIG. 2, a bearing 16 is coaxially and firmly mounted in a bearing base 17 of a partition plate 23. Optionally, an interference fit manner, a bonding manner, a screwed connection manner, and the like may be used for fixing, or a sealant is used to ensure sealing between the bearing 16 structure and the partition plate 23, so that liquid cannot enter a motor cavity 27 from a pump impeller cavity 28 through a mounting surface between the bearing 16 and the partition plate 23.

The bearing 16 of the drain pump in the present disclosure is tightly attached to a permanent magnet 12 or to a projection subjected to integral injection molding together with the permanent magnet 12, to form a first contact 24. The first contact 24 forms a limiting device for limiting axial movement of the bearing 16. The other end of the bearing 16 penetrates through a central hole in the bearing base 17 of the partition plate 23, slightly protrudes from a plane of the partition plate 23, and is tightly attached to a pump impeller 7, to form a second contact 26. The bearing design has two benefits: on one hand, a gasket design in an existing bearing design is eliminated, to simplify the structural composition of the bearing. On the other hand, in the bearing design in the present disclosure, the bottom of the pump impeller is tightly attached to the second contact of the bearing, so that the gap formed between the pump impeller and the partition plate is extremely small, thereby reducing a pressure difference existing between two sides of the pump impeller when the pump impeller runs fast, and finally drastically reducing noise generated in operation of the drain pump.

The bearing may be made of stainless steel, brass or engineering plastic, preferably an engineering plastic material that is low in price and high in injection molding efficiency, and further preferably wear-resistant self-lubricating engineering plastic. The engineering plastic is filled with solid lubricating grease and reinforcing fibers such as glass fibers and carbon fibers. The solid lubricating greases used as fine small particles are embedded in fine meshes defined by a myriad of reinforcing fibers, to greatly reduce a friction coefficient. The maximum water absorption rate of the engineering plastic is 0.2%, to prevent deformation caused by an excessive coefficient.

Further, it may be learned that if a groove is formed in a circumferential surface of the bearing, a sealing ring is placed in the groove, and the pump impeller shaft that is in rotary running contact with the bearing does not comprise a groove structure, the same sealing effect can also be achieved.

In addition, a pump casing 2 and a motor base 25 are fastened by using bolts or screws. A contact part, attached to the plane of the partition plate 23, of the pump casing 2 is a limiting table 8. The limiting table 8 is circular, the radius of the limiting table 8 is greater than that of the partition plate 23, and the limiting table 8 limits axial movement of the partition plate 23.

Embodiment 3

As shown in FIG. 1 and FIG. 2, a circumferential edge of a partition plate 23 is bent towards a motor cavity 27, to form a first extrusion sealing structure 9 of the partition plate 23. A part, corresponding to the partition plate 23, of a motor base 25 comprises a bulge, to form a second extrusion sealing structure 29 of the motor base 25. A circular sealing ring 11 is extruded by the first extrusion sealing structure 9 and the second extrusion sealing structure 29. The circular sealing ring 11 in the figures is extruded by the extrusion sealing boss structures of the partition plate 23 and the motor base 25, to prevent liquid in a pump casing 2 from entering the motor base 25 and prevent liquid from leaking from a joint between the pump casing 2 and the motor base 25.

Embodiment 4

A drain pump is described in the present disclosure, having all of the technical features according to Embodiment 1 to Embodiment 3.

Embodiment 5

A washing machine, using the drain pump according to any one of Embodiment 1 to Embodiment 4, is provided.

The drain pump has a drain pump structure shown in FIG. 1 and FIG. 2, and includes at least a pump impeller 7, a pump impeller shaft 20, a pump shaft 13, a permanent magnet 12, a bearing 16, a motor base 25, a pump casing 2, and a partition plate 23. Wherein, a sealed cavity is formed by the motor base 25 and the pump casing 2. The partition plate 23 divides the sealed cavity into two cavities on two sides. One cavity is a motor cavity 27, and the other cavity is a pump impeller cavity 28. The pump impeller 7 is located in the pump impeller cavity 28. A side of the partition plate 23 facing the motor cavity 27 is provided with a bearing base 17 with a cylindrical structure. Another side of the partition plate 23 facing the pump impeller cavity 28 is a plane. The bearing 16 is firmly mounted in the bearing base 17, and penetrates through the two cavities through a central hole in the bearing base 17 of the partition plate 23. The bearing 16 in the pump impeller cavity 28 slightly protrudes from the plane of the partition plate 23, and is tightly attached to the pump impeller 7, to form a second contact 26. The pump impeller 7 and the pump impeller shaft 20 are subjected to integral injection molding. And the pump impeller shaft 20 is tightly fixed in the bearing 16, penetrates through the partition plate 23, enters the motor cavity 27, and is connected with the pump shaft 13 in the motor cavity 27.

The pump impeller shaft 20 and the pump shaft 13 are in threaded connection with each other, and the threaded fastening direction is identical to the rotation direction of the pump impeller 7. (Certainly, those skilled in the art may also associate fixed connection between the pump impeller shaft and the pump shaft with various connection manners such as interference fit connection, bonding connection, or splined connection).

To implement sealing between the pump impeller cavity 28 and the motor cavity 27 better, a circular groove is formed in the pump impeller shaft 20 circumferentially. A sealing ring 22, preferably a V-shaped sealing ring or a Y-shaped sealing ring, is placed in the groove to completely fill a gap between the inner wall of the bearing 16 and the pump impeller shaft 20, thereby effectively preventing water from entering the motor cavity 27 from a pump cavity 18.

In addition, due to integral arrangement of the pump shaft 13 and the permanent magnet 12, component combinations are further reduced.

Further, the bearing 16 is coaxially and firmly mounted in the bearing base 17 of the partition plate 23. Optionally, an interference fit manner, a bonding manner, a screwed connection manner, and the like may be used for fixing, or a sealant is used to ensure sealing between the bearing 16 structure and the partition plate 23, so that liquid cannot enter the motor cavity 27 from a pump impeller cavity 28 through a mounting surface between the bearing 16 and the partition plate 23.

The bearing 16 of the drain pump in the present disclosure is tightly attached to a permanent magnet 12 or to a projection subjected to integral injection molding together with the permanent magnet 12, to form a first contact 24. The first contact 24 forms a limiting device for limiting axial movement of the bearing 16. The other end of the bearing 16 penetrates through the central hole in the bearing base 17 of the partition plate 23, slightly protrudes from the plane of the partition plate 23, and is tightly attached to the pump impeller 7, to form a second contact 26. The bearing may be made of stainless steel, brass or engineering plastic, preferably an engineering plastic material that is low in price and high in injection molding efficiency, and further preferably wear-resistant self-lubricating engineering plastic. The engineering plastic is filled with solid lubricating grease and reinforcing fibers such as glass fibers and carbon fibers. The solid lubricating greases used as fine small particles are embedded in fine meshes defined by a myriad of reinforcing fibers, to greatly reduce a friction coefficient. The maximum water absorption rate of the engineering plastic is 0.2%, to prevent deformation caused by an excessive coefficient.

Further, it may be learned that if the groove is formed in a circumferential surface of the bearing, the sealing ring is placed in the groove, and the pump impeller shaft that is in rotary running contact with the bearing does not comprise a groove structure, the same sealing effect can also be achieved.

In addition, the pump casing 2 and the motor base 25 are fastened by using bolts or screws. A contact part, attached to the plane of the partition plate 23, of the pump casing 2 is a limiting table 8. The limiting table 8 is circular, the radius of the limiting table 8 is greater than that of the partition plate 23, and the limiting table 8 limits axial movement of the partition plate 23.

A circumferential edge of the partition plate 23 is bent towards the motor cavity 27, to form a first extrusion sealing structure 9 of the partition plate 23. A part, corresponding to the partition plate 23, of the motor base 25 comprises a bulge, to form a second extrusion sealing structure 29 of the motor base 25. A circular sealing ring 11 is extruded by the first extrusion sealing structure 9 and the second extrusion sealing structure 29. The circular sealing ring 11 in the figures is extruded by the extrusion sealing boss structures of the partition plate 23 and the motor base 25, to prevent liquid in the pump casing 2 from entering the motor base 25 and prevent liquid from leaking from a joint between the pump casing 2 and the motor base 25.

According to the drain pump used by the washing machine of the present disclosure, the pump impeller 7 and the pump impeller shaft 20 are of an integral structure. Due to the design, the pump impeller shaft 20 can pass, through the interior of the bearing 16, through the partition plate 23 into a permanent magnet 12 rotation cavity, so that a joint between the pump impeller shaft 20 and the pump shaft 13 is in a liquid-free cavity environment. Therefore, water corrosion at the joint is out of consideration, and to a large extent the structure of the drain pump is greatly simplified.

In addition, the optimized bearing design has two benefits: on one hand, a gasket design in the existing bearing design is eliminated, to simplify the structural composition of the bearing. On the other hand, in the bearing design in the present disclosure, the bottom of the pump impeller is tightly attached to the second contact of the bearing, so that the gap formed between the pump impeller and the partition plate is extremely small, thereby reducing a pressure difference existing between two sides of the pump impeller when the pump impeller runs fast, and finally drastically reducing noise generated in operation of the drain pump.

Therefore, the washing machine with the drain pump according to any one of Embodiment 1 to Embodiment 4 is simpler in structure, and more convenient to overhaul. In addition, the noise level is lower than that of a conventional washing machine.

The aforementioned embodiments are merely preferred embodiments of the present disclosure, but do not constitute a limitation in any form to the present disclosure. Although the present disclosure has been illustrated above by using the preferred embodiments, the preferred embodiments are not used to limit the present disclosure. Changes or modifications made, without departing from the scope of the technical solutions of the present disclosure, by those skilled in the art by using the aforementioned technical content are equivalently changed equivalent embodiments. Any simple changes, equivalent variations and modifications made to the aforementioned embodiments with reference to the technical essence of the present disclosure shall fall within the scope of the solutions of the present disclosure, provided that they do not depart from content of the technical solutions of the present disclosure.

The invention claimed is:

1. A drain pump, comprising a pump impeller, a pump impeller shaft, a pump shaft a permanent magnet, a bearing, a motor base, a pump casing, and a partition plate, wherein,
   a sealed cavity is formed by the motor base and the pump casing; the partition plate divides the sealed cavity into two cavities on two sides, one cavity is a motor cavity, and the other cavity is a pump impeller cavity;
   the pump impeller is located in the pump impeller cavity;
   a side of the partition plate facing the motor cavity is provided with a bearing base with a cylindrical structure;
   another side of the partition plate facing the pump impeller cavity is a plane;
   the bearing is firmly mounted in the bearing base, and penetrates through the two cavities through a central hole in the bearing base of the partition plate;
   the bearing in the pump impeller cavity slightly protrudes from the plane of the partition plate, and is tightly attached to the pump impeller, to form a second contact;
   the pump impeller and the pump impeller shaft are subjected to integral injection molding; and the pump impeller shaft is tightly fixed in the bearing, penetrates through the partition plate, enters the motor cavity, and is connected with the pump shaft in the motor cavity.

2. The drain pump according to claim 1, wherein the pump impeller shaft and the pump shaft are in threaded connection, and a threaded fastening direction is identical to a rotation direction of the pump impeller.

3. The drain pump according to claim 1, wherein a circular groove is formed in the pump impeller shaft circumferentially, and a sealing ring is arranged in the groove, to completely fill a gap between an inner wall of the bearing and the pump impeller shaft.

4. The drain pump according to claim 1, wherein the pump shaft and the permanent magnet are integrally arranged.

5. The drain pump according to claim 1, wherein the bearing is tightly attached to the permanent magnet or to a projection subjected to integral injection molding together with the permanent magnet, to form a first contact.

6. The drain pump according to claim 1, wherein the pump casing and the motor base are fixedly connected by bolts or screws; a contact part, attached to the plane of the partition plate, of the pump casing is a limiting table; the limiting table is circular; and the radius of the limiting table is greater than that of the partition plate.

7. The drain pump according to claim 1, wherein a circumferential edge of the partition plate is bent towards the motor cavity, to form a first extrusion sealing structure of the partition plate.

8. The drain pump according to claim 7, wherein a part, corresponding to the partition plate, of the motor base comprises a bulge, to form a second extrusion sealing structure of the motor base.

9. The drain pump according to claim 8, wherein a circular sealing ring is extruded by the first extrusion sealing structure and the second extrusion sealing structure.

10. A washing machine, comprising the drain pump according to claim 1.

* * * * *